Sept. 20, 1971   W. BALTZER   3,606,088
MEMBRANE VALVE FOR SPRAY CONTAINERS
Filed Dec. 2, 1968   9 Sheets-Sheet 5
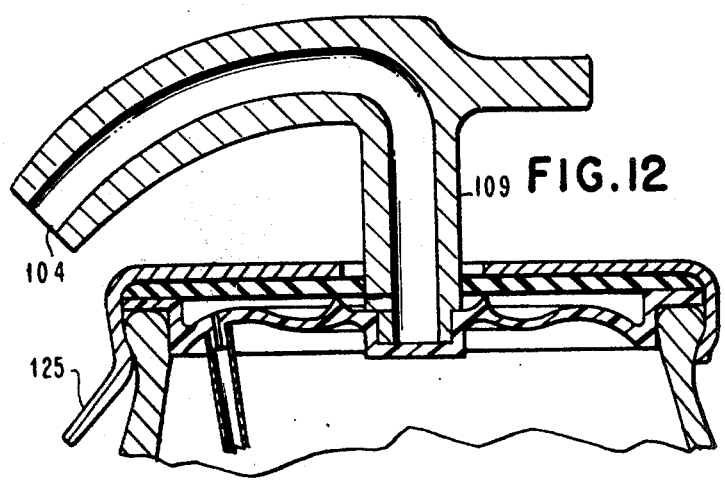
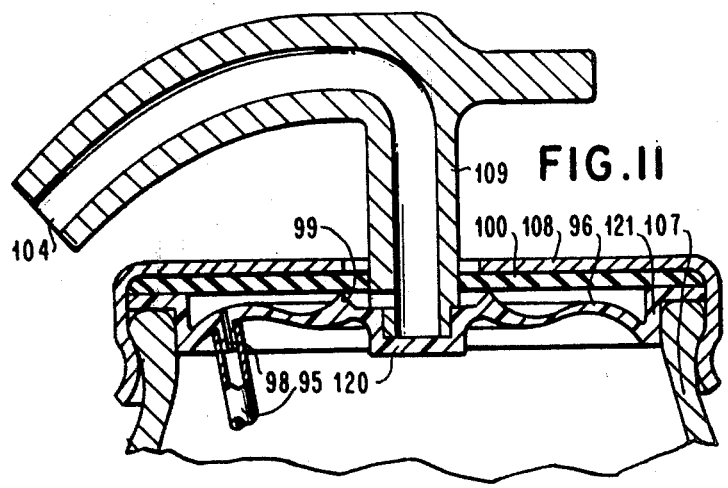

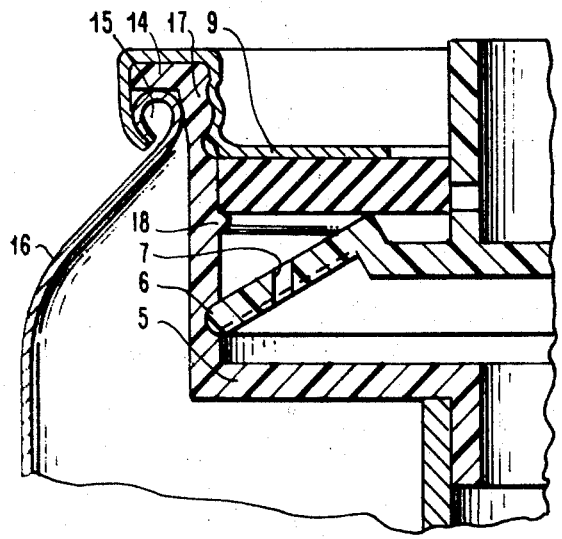
FIG.2a
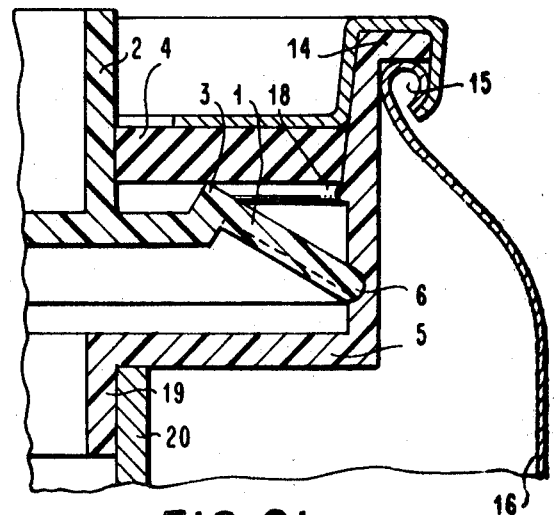
FIG.2b
FIG.1a   FIG.1b
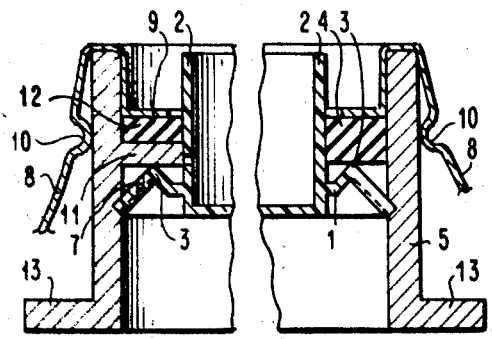
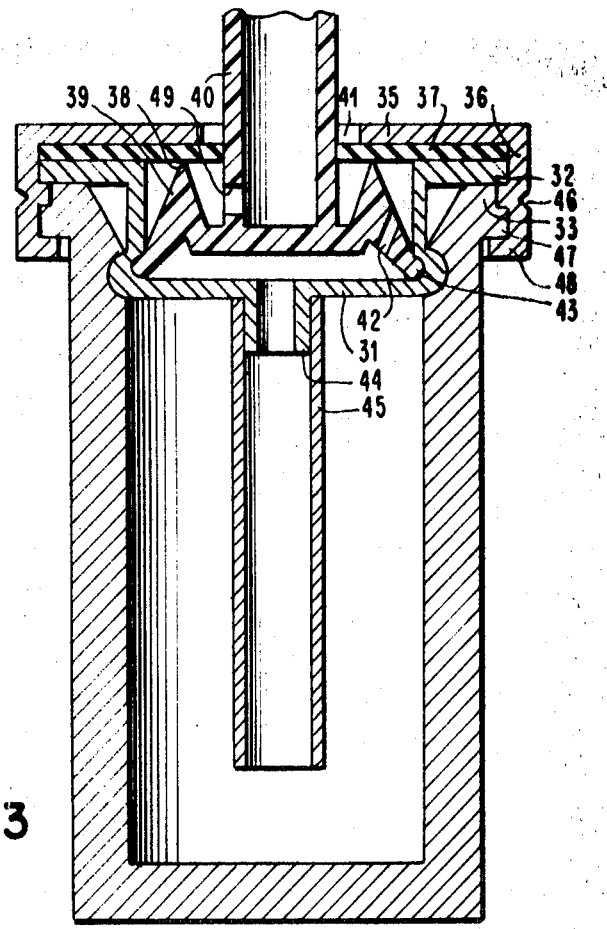
FIG.3

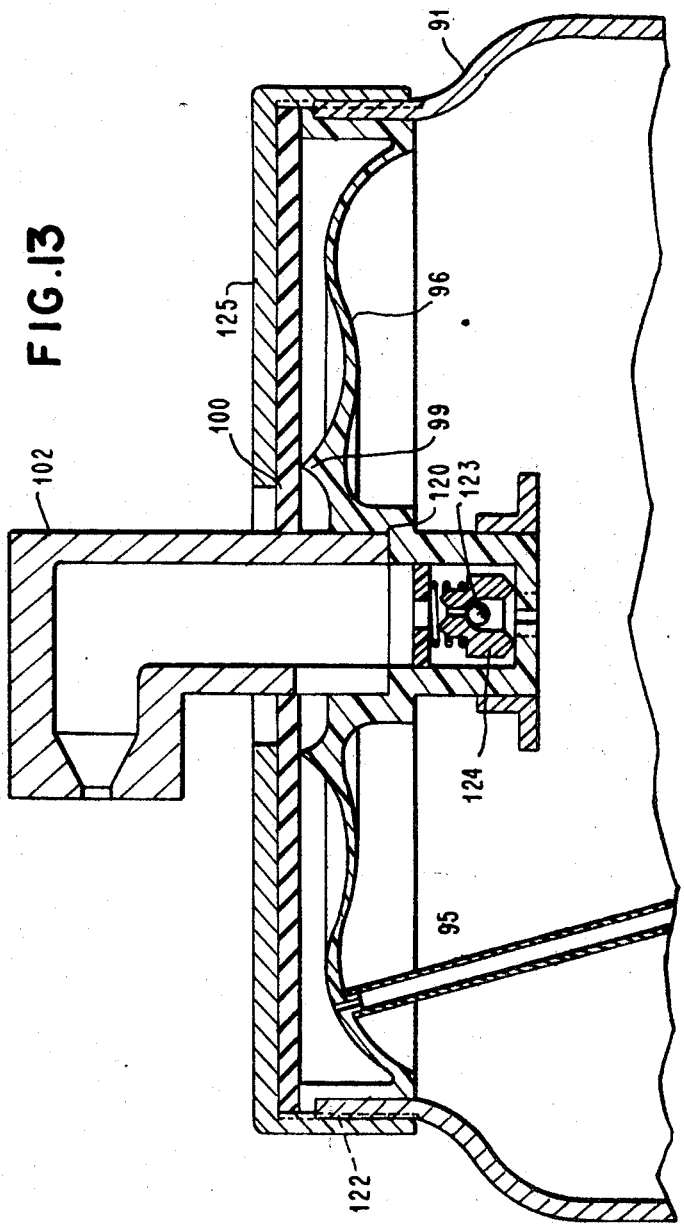

Sept. 20, 1971 W. BALTZER 3,606,088
MEMBRANE VALVE FOR SPRAY CONTAINERS
Filed Dec. 2, 1968 9 Sheets-Sheet 7

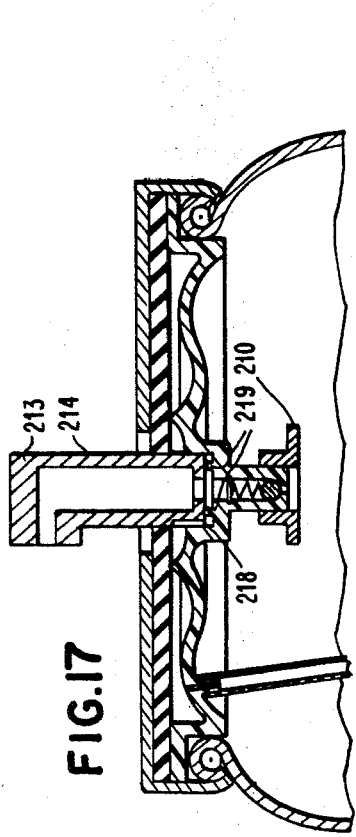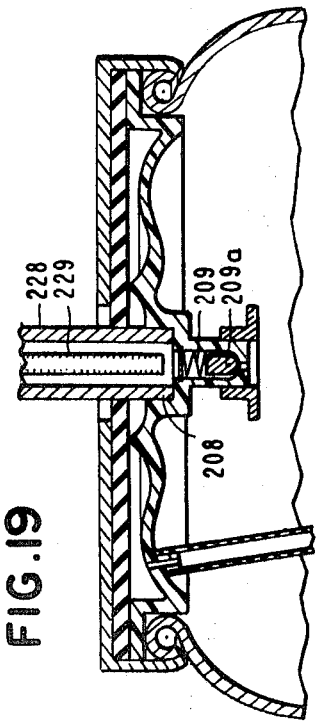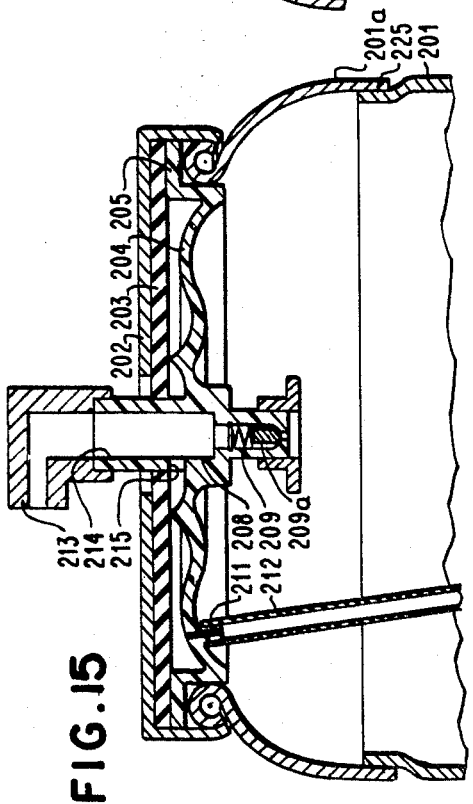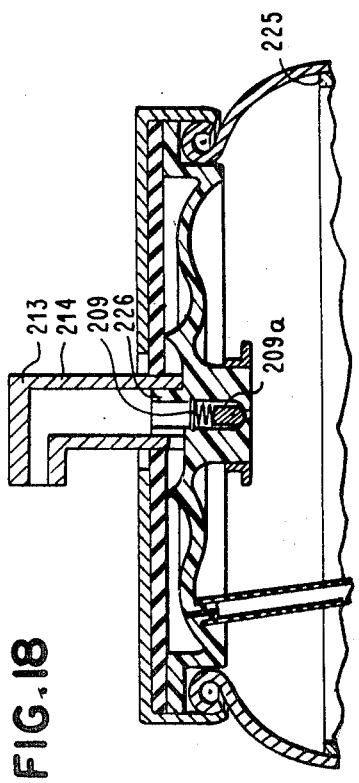

> # United States Patent Office

> 3,606,088
> Patented Sept. 20, 1971

3,606,088
MEMBRANE VALVE FOR SPRAY CONTAINERS
Walter Baltzer, Bad Ems, Germany, assignor to Beleggingsmaatschappij "Industriebank" N.V., The Hague, Netherlands
Filed Dec. 2, 1968, Ser. No. 780,321
Int. Cl. B65d 33/00
U.S. Cl. 222—94                           32 Claims

ABSTRACT OF THE DISCLOSURE

Membrane valve for spray containers includes a substantially plate-shaped member having a marginal edge adapted to be retained under stress substantially at the wall of a spray container, the plate-shaped member having a flexible annular zone between the marginal edge and a center portion thereof, the flexible annular zone being formed with an opening therethrough, an annular sealing lip formed on one side of the plate-shaped member around the center portion thereof and being prestressed into engagement with a valve seat and defining a closed chamber therewith and means for disengaging the annular sealing lip from the valve so as to provide communication between the chamber and the other side of the plate-shaped member through the opening in the flexible annular zone thereof.

---

My invention relates to a membrane valve for spray cans that are used manually and more particularly for two chamber containers having a centrally located sprayhead extension, a sealing lip surrounding the latter and lateral flow-through openings for the substance.

It has been known heretofore to employ sealing membranes for closing aerosol containers. Such membranes are generally prestressed for closing the valve of the spray can. They do not operate as valves per se but rather, have only the function, on the one hand, of sealing the container opening and, on the other hand, of replacing metallic springs used heretofore for closing the valves and which are not free of corrosion from all substances with which the aerosol containers may be filled. The sealing membranes operate in part exclusively due to the prestressing applied thereto when they are inserted into the valve housing or they supplement or reinforce the action of the valve springs due to the inherent elasticity thereof.

Such sealing membranes are preferably formed of a vulcanized expansible rubber or plastic material and are of the type mentioned, for example, in the Swiss Pat. 431,411 to Giorgi. Reference can furthermore be made to German Pat. 1,052,193 to Dodge and Seymour, and U.S. Pat. 2,863,699 to Elser, which describe rubber valves that are suspended on expansible arms.

The central portion of the sealing membranes is enlarged or "beefed up" into a partially spherical collet and, with the aid of a metallic rim, is inserted into a valve housing so that it rests sealingly against the edge of the opening of the valve. It is thus completely stressed for expanding as it consists of a vulcanizable material. Such materials were found to be too expensive, however, in actual production.

When the valve housing is formed of sheet metal, as in the aforementioned German patent to Dodge et al., it is not corrosion-resistant to certain substances with which the spray can may be filled. The valve proper has such a small diameter that it can be used only for single-chamber containers. In the aforementioned U.S. Patent to Elser, nylon or similar materials are used. The construction, due to the multiple parts thereof, is too complicated for practical applications.

It is accordingly an object of the present invention to eliminate the foregoing shortcomings of the heretofore known membrane valves and to provide membrane valve that will not only be corrosion-resistant and relatively inexpensive to produce but will also be particularly suitable for use in connection with two-chamber cans or containers.

It is also an object of my invention to provide flow-through openings of such size in the membrane valve through which the spray can may be filled and discharged, which will permit a filling process to be carried out without delay and which will make it possible to attach to the membrane valve riser tubes that extend down to the bottom of the spray can, or flexible divider bags.

With the foregoing and other objects in view, I provide in accordance with my invention a valve membrane expansible across the entire cross-sectional area of the opening of a spray can and preferably comprised of a stiffly elastic plastic material and having an edge engageable under tension in an annular groove formed in the valve housing. The valve housing is sealingly disposed at or on the opening of the spray can.

An advantage derivable therefrom is that the internationally standardized aerosol can, which has an opening diameter of one inch, can thus be used with my membrane valve. In accordance with the invention, the valve housing is placed, for this purpose, on the rim of the spray can opening and attached thereto by means of a valve plate. This valve housing is insertable into the can opening in cylindrical form and without any constriction. The edge of the membrane valve is received in an annular groove formed in the valve housing, and the membrane valve consequently has an effective surface corresponding substantially in area to the cross section of the spray can opening. This renders it possible to use the membrane for two-chamber cans and for standard openings of the cans.

In accordance with another feature of the present invention, the container dome is of such construction as to serve of itself, as the valve plate. Preferably, the container dome of this embodiment surrounds the upper edge of the valve housing. This embodiment is particularly advantageous when a two-part can is to be used.

In accordance with a further feature of the invention, the valve housing is slid from below, together with a flexible divider bag mounted on a conventional welding collar, into the container dome, preferably by inserting a soft elastic washer or perforated disc, and is fastened from the outside by clinching or pinching of the container dome.

In another embodiment of the invention, the bottom surface of the valve housing is provided with an extension tube, on which a feeding pipe is telescoped in a conventional manner as by press-fitting.

In the above-suggested types of construction, the valve housing and the membrane valve inserted therein, can be formed by extrusion of a stiffly elastic plastic material. The membrane is provided with one or more flow-through openings for the active substance contained in the spray can. It is also provided with an adapter tube for mounting the spray valve thereon. The spray valve is formed with radial flow-through openings for the material to be sprayed therefrom. When the adapter tube is slightly depressed by actuating the spray head in axial or radial direction, these radial flow-through openings open simultaneously with the ring-shaped sealing lip of the membrane.

In accordance with yet another feature of my invention, I provide a membrane valve which is effective across the entire cross section of the opening of a spray container and which is located in a valve housing which rests in sealing relation, with its edge respectively against the edge of the opening of the spray container.

More specifically, the valve plate flatly covers the opening of the spray container and surrounds it with a beaded edge. This flat construction permits the full utilization of the inside space of the spray container for the membrane valve and the filling contents, which is of particular importance for pocket-size spray containers which have a small filling area. The flat valve plate may be stamped out with a beaded edge in an automatic device and is very inexpensively produced. The opening of the spray container is provided in accordance with the invention with a double fold or notch at its outer rim. During assembly, the beaded edge of the valve plate is located on the upper edge of the double notch, while the lower edge of the double notch serves to fasten the lower, free end of the beaded edge of the valve plate to the spray container.

The valve membrane has sealing lips extending upwardly into the plane of the opening in the spray container and is prestressed into engagement with the flat valve plate or against a soft elastic sealing disc located therebeneath. At its lower edge, the membrane is supported in an annular bulge against the valve housing. Since the upper edge of the valve housing is located on the edge of the container opening, it forms a structural unit with the valve plate, whose beaded edge encircles the valve housing from below, at its outer rim by means of a corrugation and presses the valve plate upwardly.

According to a further feature of may invention, the edge of the membrane extends downwardly at an angle to the generally plate-shaped member. It is spring-supported on an abutment within the opening of the spray container. This abutment can be provided in form of an annular groove by reducing the wall thickness within the continer opening, thereby dispensing with the valve housing of a previously mentioned embodiment. The insertion of the membrane is facilitated by upwardly tapering the rim at the open end of the spray can.

According to a further feature of my invention, the membrane valve is formed with a central cup-shaped, axially extending recess for receiving therein the adapter tube, and has a ring-shaped sealing lip defining the recess wherefrom the valve membrane extends flatly and radially to a downwardly directed marginal edge thereof, a flow-through opening being provided in this flat region of the membrane. Further in accordance with the invention, the membrane is in the shape of an inverted cup and has in a center portion thereof an upwardly opening cup-shaped recess defined by a wall portion extending from the upper surface of the membrane. The upwardly extending wall portion serves as a ring-shaped sealing lip which, due to prestressing imparted to the membrane is forced into engagement with a valve seat provided on a valve plate or on a sealing disc located below the valve plate. Flow-through grooves are formed either within the wall of the cup-shaped recess or in the adapter tube proper. The spray head or the adapter tube on which the spray head is mounted can thus be removed from the cup-shaped recess and exchanged at any time.

In accordance with another feature of the invention, the inverted cup-shaped membrane is upwardly bulged in the region thereof located between the flow-through opening and the marginal edge thereof so as to form a grooved ring acting as a compression spring.

If it is necessary for some special reasons to adjust the spring action of the membrane to specific filling conditions, this can be done with the aid of the grooved ring that acts as a compression spring.

Generally, the stiff-elastic plastic material known by the trade name "Hostaform" is well suited for use in forming the membrane valve of my invention.

In accordance with a further feature of my invention, the adapter tube or feed line to the spray head is provided with lateral through openings, preferably in the form of slots. It can either form a structural unit with the membrane valve and be fitted at a free end thereof to the attachable spray head or may be used as an independent adapter or feed tube, in which case it is provided with lateral grooves or slots and fitted into a cylindrical, cup-shaped recess formed in the membrane valve.

According to another embodiment of my invention, the feed line or adapter tube forms a structural unit with the spray head and is also equipped at the lower end thereof with longitudinal grooves as well as with spacers located opposite the bottom surface of the cup-shaped recess. If externally smooth sealed adapter or feed tubes are to be used, then the cup-shaped recess is provided at the inner surface thereof with vertical grooves and at the bottom surface thereof with through channels for the active substance received in the container which enters the adapter tube or feed line from the grooves.

Further in accordance with my invention, these grooves, slots or through channels are dimensioned to correspond to the respective, desired dosage of the discharging container contents. Thus, they also constitute flow-through grooves, slots or channels.

In accordance with other features of my invention, the cup-shaped recess in the membrane not only serves for receiving and supporting therein the adapter or supply tube which conducts the container contents to the spray head but may simultaneously be used for filling the container by substituting a filling nozzle for the adapter or supply tube and by providing a check valve at the bottom of the recess.

In addition to the check valve for filling the containers with liquid or gaseous expansion agents, the recess is also equipped with an excess pressure valve according to another feature of the invention. Both valves preferably form a single structural unit. The installation of a safety valve at the bottom of the container can thus be omitted, and conventional containers can be used. This feature not only prevents the formation of dangerous excess pressures during the container filling process but also assures complete safety against their occurrence, for example, by overheating of a spray can.

In accordance with a further inventive feature, an adapter for installing a bag for an expansion agent is provided outside the recess to separate it from the effective container contents in the case when the expansion agent might have an undesired effect upon the effective contents of the container.

The membrane valve according to the invention is usable with liquefied gas as well as with air, carbon dioxide or other gases proper.

Further in accordance with the invention, in place of the cup-shaped recess, an axially extending tap is provided over which the supply tube is mounted.

When a cup-shaped recess is used, metering grooves and spacers for the passage of the active substance are provided at the inner wall surface or at the bottom surface of the recess or on the outer surface of the adapter or supply tube. In the latter instance, the inner wall surface and the bottom surface of the cup-shaped recess may remain smooth and may be fitted, for example, for sealingly receiving a filling nozzle.

In accordance with a further feature of the invention, the filling and refilling of the expansion agent is effected through the excess pressure valve by means of a filling nozzle, the excess pressure valve, during the filling period, being opened by means acting from the outside.

As an additional feature of the invention, the closure member of the excess pressure valve is preferably formed cylindrically of magnetic material, such as soft iron, and is raised from its seat by an external magnet. This magnet is preferably an electromagnet placed inside the filler nozzle and spaced a distance from the inside wall adequate for the filling operation.

The magnet should be excited only during the filling process. If for reasons of construction, the magnetically attractive closure member is located at a greater distance from the magnet, it is provided with a pin passing through a restoring spring at whose end an armature is located. It is particularly advantageous, when employing a hard plastic for the membrane, to reduce the thickness of the membrane between the sealing lip and the shoulder rim. If it should be necessary to separate the effective substance in the container and the expansion agent by using an elastic bag, the through openings for the substances are preferably so adjusted that an exchange of these bags is possible. Thus, the excess pressure valve may be interchangeably provided with a flexible expansion agent bag and the through opening or the check valve with a flexible bag for holding the container contents, if necessary by employing adapters.

To effect the mounting or exchange of the bags, it is preferable to arrange the valve body, i.e. the valve cover, valve membrane and intervening yieldable washer, in the dome of a separable container.

In accordance with the invention, the valve cover proper is provided with a screw thread by which it can be threaded on the opening of the aerosol container or bottle.

Of special advantage is an excess-pressure valve construction wherein it is pressed with annular sealing lips against the bottom surface of the cup-shaped recess by spring force, and provided with a passage for the substance filling the container that is in the form of a check valve.

In the latter embodiment, a magnet is not needed for filling or refilling purposes. The excess pressure valve remains closed during the filling process. The filling forces the built-in check valve open and enters through this valve into the container. At the end of the filling process, the valve closes automatically.

While in the latter embodiment the check valve permits the filler to enter into the aerosol container, another construction provides for the excess pressure valve to be automatically opened by the filling substance, so that there is neither a requirement for a special axial passage nor a check valve arranged therein. In this embodiment, the excess pressure valve is formed by the outlet opening in the bottom of the cup-shaped recess with the upward extending sealing lips and with a flexibly mounted valve seat. The filling substance passes through grooves provided between the inside wall and the bottom of the recess and raises the valve seat from the sealing lips from below. Following the filling process, the excess pressure valve again closes automatically.

Other features which are considered as characteristic for the invention are set forth in the appended claims. Although the invention is illustrated and described herein as embodied in membrane valve for spray containers, it is nevertheless not intended to be limited to the details shown, since various modifications and structural changes may be made therein without departing from the spirit of the invention and within the scope and range of equivalents of the claims. The construction of the invention, however, together with additional objects and advantages thereof will be best understood from the following description of specific embodiments when read in connection with the accompanying drawings, in which:

FIGS. 1a, 1b, 2a, and 2b are sectional views of different embodiments of the membrane valve of my invention;

FIGS. 3 and 4 are longitudinal sectional views of different embodiments of miniature containers employing the membrane valve;

FIGS. 9–12 are sectional views of modified forms of the membrane valve assembled in containers of different types;

FIGS. 13–21 are sectional views of modified forms of the membrane valve usable with divider bags.

Like reference numerals are used for identifying similar components in the embodiments.

Figure 4:
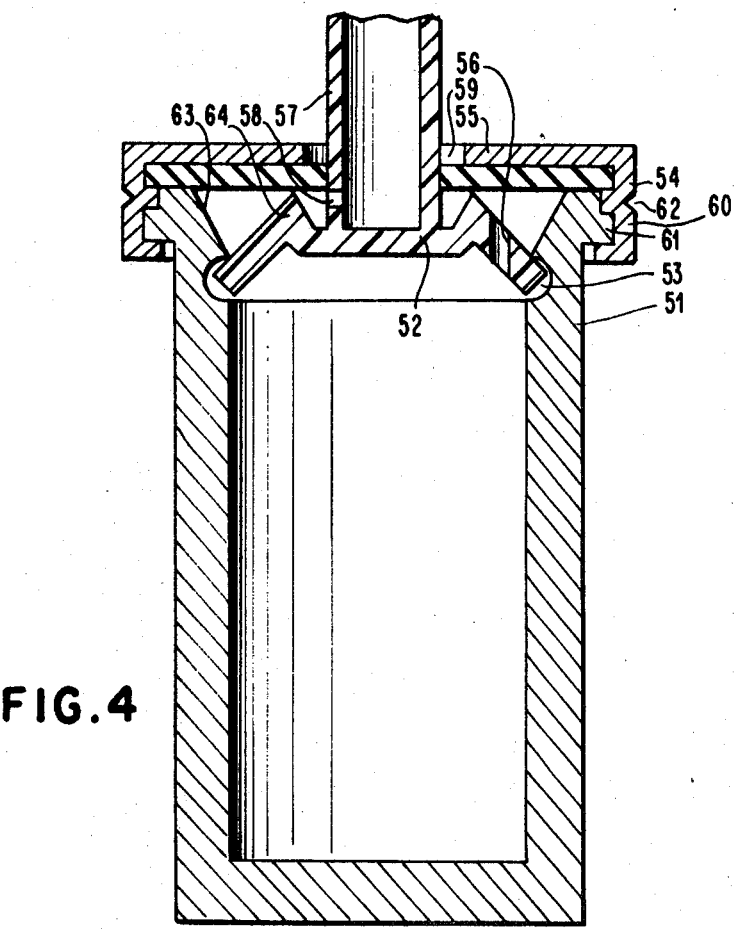

The membrane 1 is in the form of a plate to which an adapter tube 2 is connected for receiving a non-illustrated head. The adapter tube 2 is closed at the bottom thereof and forms a structural unit with the membrane 1. The adapter tube 2 is surrounded by a ring-shaped sealing lip 3 which can press against the soft-elastic perforated disc or washer 4 of the embodiment of FIGS. 1b, 2a and 2b, and serves as a valve seat. From the sealing lip 3, an elastic flat edge extends toward the valve housing 5 and is retained with required prestressing in an appropriate annular groove 6 formed in the housing 5. The membrane 1 is provided with a flow-through opening 7.

In FIGS. 1a and 1b, the dome 8 of the spray container is shaped so that it simultaneously forms a valve plate 9. It is shaped in such manner as to permit the insertion therein of the valve housing 5 from below. A clinching bead 10 is formed in the dome 8 for securing the latter to the valve housing 5.

In the left-hand view of FIG. 1a, the valve housing 5 has a radially inwardly extending rim 11 which forms the valve seat for the sealing lip 3. A soft-elastic perforated disc or washer 12 is inserted between the valve plate 9 and the annular rim portion 11 for sealing purposes.

In the right-hand view of FIG. 1b, the rim portion 11 is omitted so that the sealing lip 3 presses directly against the soft-elastic ring 4.

In FIGS. 1a and 1b, the valve housing 5 is provided with a welding collar 13 which serves for welding a flexible divider bag thereto, so as to form a two-chamber container thereby.

The embodiments of FIGS. 2a and 2b have a valve housing 5 that is provided with a special rim 14 which is disposed on the flanged edge 15 of the spray can 16. The valve plate 9 sealingly grips the rim 14 of the valve housing 5, at the flanged container edge 15.

In the left-hand view of FIG. 2a, the inner edge of the opening of the valve housing 5 is provided with a grooved or wave-shaped structure 17, into which the valve plate 9 can be pressed.

In the right-hand view of FIG. 2b, the wave-shaped structure 17 is dispensed with. In both embodiments of FIGS. 2a and 2b, the soft-elastic sealing disc 4 is held under compression by radially inwardly extending protrusions 18.

The valve housing 5 is provided in the embodiments of FIGS. 2a and 2b, with a cylindrical extension member 19, to which a riser tube 20 is telescopically attachable in a conventional manner as by press fitting, for example.

The embodiment according to FIGS. 2a and 2b permits the use of the internationally standardized spray cans having a one-inch opening as one-part so-called mono-block cans because the valve housing previously provided with all equipment related thereto can simply be mounted upon the can from the outside and can also be secured from the outside.

As shown in FIG. 3, the valve housing 31 is supported by its outer edge 32 upon the rim 33 of an opening formed in a cylindrical spray container 34, which may be of a miniature size. The valve plate 35 is flat and has a beaded edge 36. Between the valve plate 35 and the edge 32 of the valve housing 31, there lies a soft-elastic sealing disc 37 which also serves as a valve seat for the ring-shaped sealing lip 38, formed in a modified form of the valve membrane 39 of my invention. An adapter tube 40, on which a non-illustrated spray head is mounted, extends upward from the center of the valve membrane 39 through the sealing disc 37 and through an enlarged opening 41 of the valve plate 35. The adapter tube 40 is provided with a flow-through opening 49 at the lower end thereof. The membrane 39 is formed with a flow-through opening 42. The membrane is braced at the lower edge 43 thereof against the valve housing 31, with prestressing, which tightly presses the sealing lip 38 against its seat on the soft-elastic sealing disc 37.

The valve housing 31 is provided with a downwardly projecting adapter tube 44 to which the riser tube 45 is telescopically attached.

The membrane valve 39 can be opened by applying a vertically downward as well as lateral force to the non-illustrated spray head. The content of the spray container 34 passes through the riser tube 45 and the adapter tubular extension 44 into the valve housing 31 and emerges through the opening 42 into the upper sealed chamber of the membrane 39. When the non-illustrated spray head is vertically depressed or shifted laterally, the sealing lip 38 is lifted from its valve seat 37, so that the spray material passes unobstructedly through the flow-through opening 49 into the adapter tube 40 and thus through the non-illustrated spray head into the surrounding air.

The beaded edge 36 of the flat valve plate 35 is drawn down so far that it can be tightly pressed against the double notch 47 by means of the corrugation 46 from above, and by the radially inwardly bent edge 48 from below. In this manner, the valve housing 31, with the membrane 39 contained therein, the sealing disc 37 and the valve plate 35 are combined into a structural unit according to the invention by impressing the corrugation 46 into the beaded edge 36. This combined structural unit may be placed as an entity upon the marginal edge 33 of the opening formed in the container 34 in one operating step, and may be firmly joined with the spray container 34, in pressure-tight relation, by bending in the edge 48 thereof.

In the embodiment of FIG. 4, there is provided a membrane 52, which is directly inserted within the opening at the upper end of a spray can 51. The special valve housing of the embodiment shown in FIG. 3 is dispensed within the embodiment of FIG. 4, since the membrane 52, fully extending across the opening of the spray container 51, is supported on an abutment 53, formed by an annular groove in the container wall at the opening thereof. In this manner, an adequate prestressing of the membrane 52 is effected with respect to the sealing member 54 or the valve plate 55.

Since the membrane valve covers the entire cross-sectional area of the container opening, the flow-through opening 56 in the annular flexible zone of the membrane can be so large as is necessary for ensuring rapid filling of the spray can as well as rapid discharge of the spray contents from the container. This is true even for pocket-size spray containers. In the embodiment of FIG. 4, the adapter tube 57 for the non-illustrated spray head is integral with the membrane 52. It has a flow-through opening 58 which serves both to ensure rapid filling operations as well as rapid discharge of the container contents.

The valve plate 55 has a center opening 59 which is large enough to permit sufficient clearance both for moving the adapter tube 57 vertically downward or sidewise in order to open the valve. The outer edge of the spray container 51 is provided with a beaded collar 61, around which the beaded edge 60 of the valve plate 55 is pressed, so as to engage the bead 61 from above and from below. The enclosure at the top is effected by the corrugation 62. This connects the sealing disc 54 tightly with the valve plate 55 so that both members 54 and 55 form a single unit into which the adapter tube 57 is inserted from below.

The unitary adapter tube 57 and membrane 52 are inserted from above into the container opening which in the embodiment of FIG. 4 has an inclined wall surface 13 for facilitating entry of the membrane 52. By locking the marginal edge of the membrane 52 in the groove abutment 53, the membrane is prestressed so that the sealing lips 64 thereof are forced into engagement with the soft-elastic sealing member 54.

Figure 5:
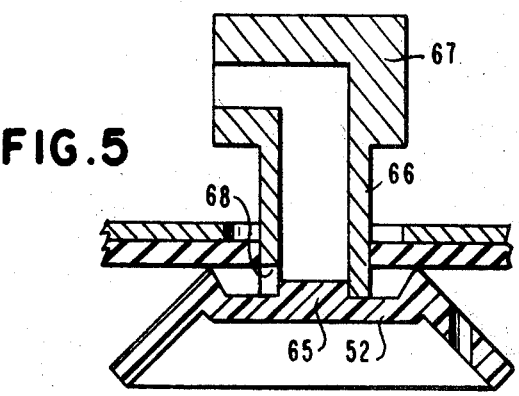
FIG. 5 is a fragmentary sectional view of a modification of the embodiments of FIG. 4.

The embodiment of FIG. 5 differs from that of FIG. 4 in that the adapter tube 66 is not integral with the membrane 52. Instead, a retaining boss 65 is provided on the membrane 52, on which the adapter tube 66 for the spray head 17 is telescopically mounted. The flow-through opening 68, formed in the lower tubular portion 66, is accommodated to the dimensions of the retaining boss 65 so that a specific directing of discharging spray material is afforded.

Due to the fact that the tubular portion 66 and the holding boss 65 are cylindrical the directing of spray material can be appropriately adjusted by turning the spray head 67.

The embodiments of FIGS. 3 to 5 are of midget or miniature spray containers that are carried on the person (in pockets or handbags), and are of the type used for cosmetics. For this reason, the flow-through opening 56 in the membrane is shown without a connection for a riser tube. These pocket-size cans are preferably operated in upside down position and therefore do not require any riser tubes which extend to the bottom of the container.

Figure 6:
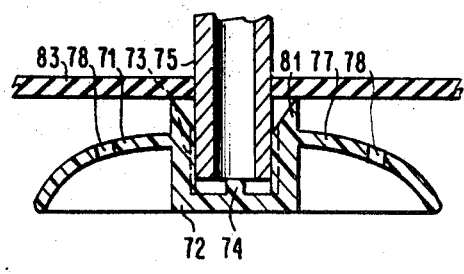
FIGS. 6, 7 and 8 are sectional views of additional embodiments of my membrane valve.
Figure 7:
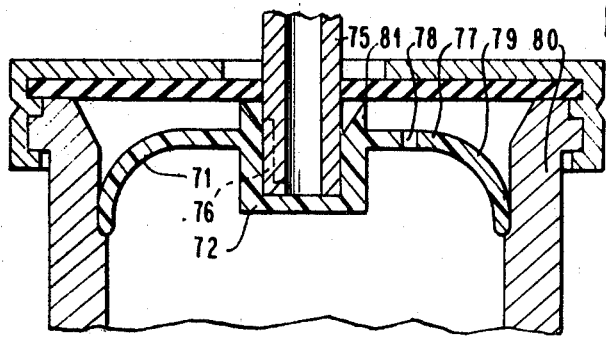

The embodiments of FIGS. 6 and 7 differ mainly in the location of the flow-through grooves. Thus, in FIG. 7 these are formed in the walls defining the cup-like recess 72 formed in the membrane 71. The metering groove 73 extends along the surface of the cup-shaped recess 72. Spacers or bosses 74 located at the bottom of the cup-shaped recess 72 prevent the adapter tube 75 from directly engaging the bottom surface of the recess 72.

In FIG. 7, the flow through groove 76 is formed in the adapter tube 75, while the surface of the cup-shaped recess 72 is smoothly cylindrical. The flat portion 77 of the membrane 71 is formed with a flow-through opening 78, while the marginal edge portion 79 of the membrane 71 is braced resiliently spring-stressed against the inner surface of the opening formed in the spray container 80. The ring-shaped sealing lips 81 define the cup-like recess 72 and extend upwardly from the flat part 77 of the membrane 71. The prestressed spring action of the membrane 71 causes the sealing lips 81 to abut against the soft-elastic sealing disc 83.

Figure 8:
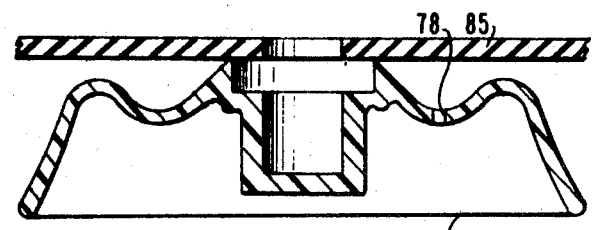

FIG. 8 shows the membrane 71 in another modified form. An annular upwardly convex bulge 85 is provided between the flow-through opening 78 and the marginal edge of the membrane valve and acts as a compression spring. It can be used particularly when the elastic properties of the membrane 71 must be adjusted to meet the specific filling conditions for the spray container.

Figure 9:
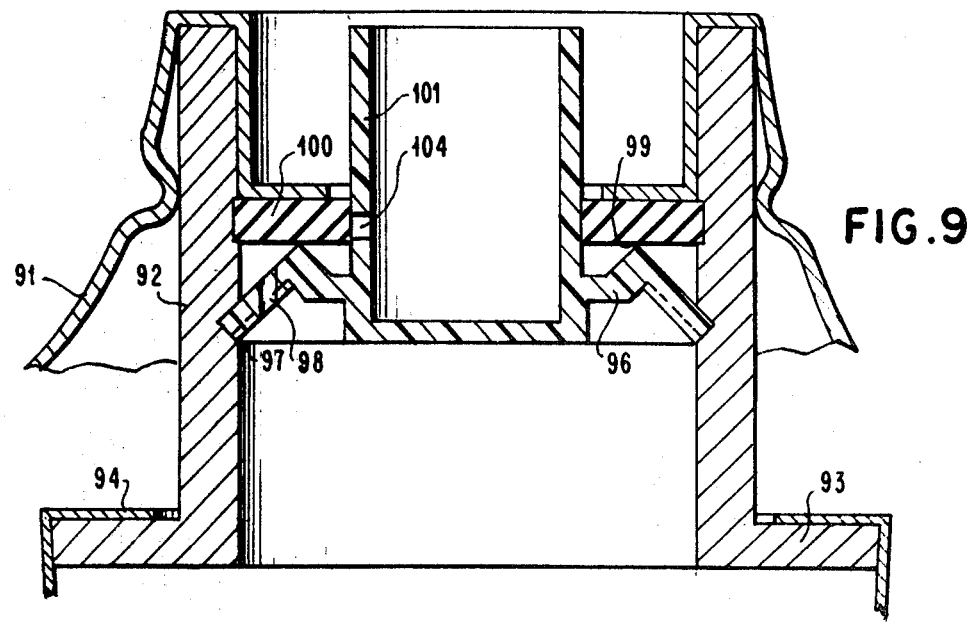

In FIG. 9, there is shown the dome portion 91 of an aerosol container. It encloses the upper rim of the valve housing 92. The latter is comprised of a hollow cylinder which has at its lower end 93, a collar-shaped attachment on which an elastic bag 94 can be welded or otherwise secured. The valve housing 92 is provided with an annular groove 97 in which the outer edge of the valve membrane 96 is received. The membrane 96 is formed with a through opening 98, affording a passage for the effective contents of the container. A ring-shaped sealing lip 99 presses against a soft-elastic washer 100 due to the inherent elasticity of the membrane 96. In the embodiment of FIG. 9, the washer 100 is inserted at its outer edge in an annular recess formed in the valve housing and upwardly engages the inner edge of the dome portion 91 of the aerosol or spray container. The membrane valve 96 is provided at the top thereof with a cylindrical supply tube 101 which constitutes the connection to the non-illustrated spray head. A through opening 104, preferably in the form of a slot, is forced, by actuation of the spray head, so far into the interior of the container that the contents of the container discharge through the opening 98, the space between the disengaged ring-shaped sealing lip 99 and the washer 100 and the opening 104, into the supply tube 101 to the non-illustrated spray head.

Figure 10:
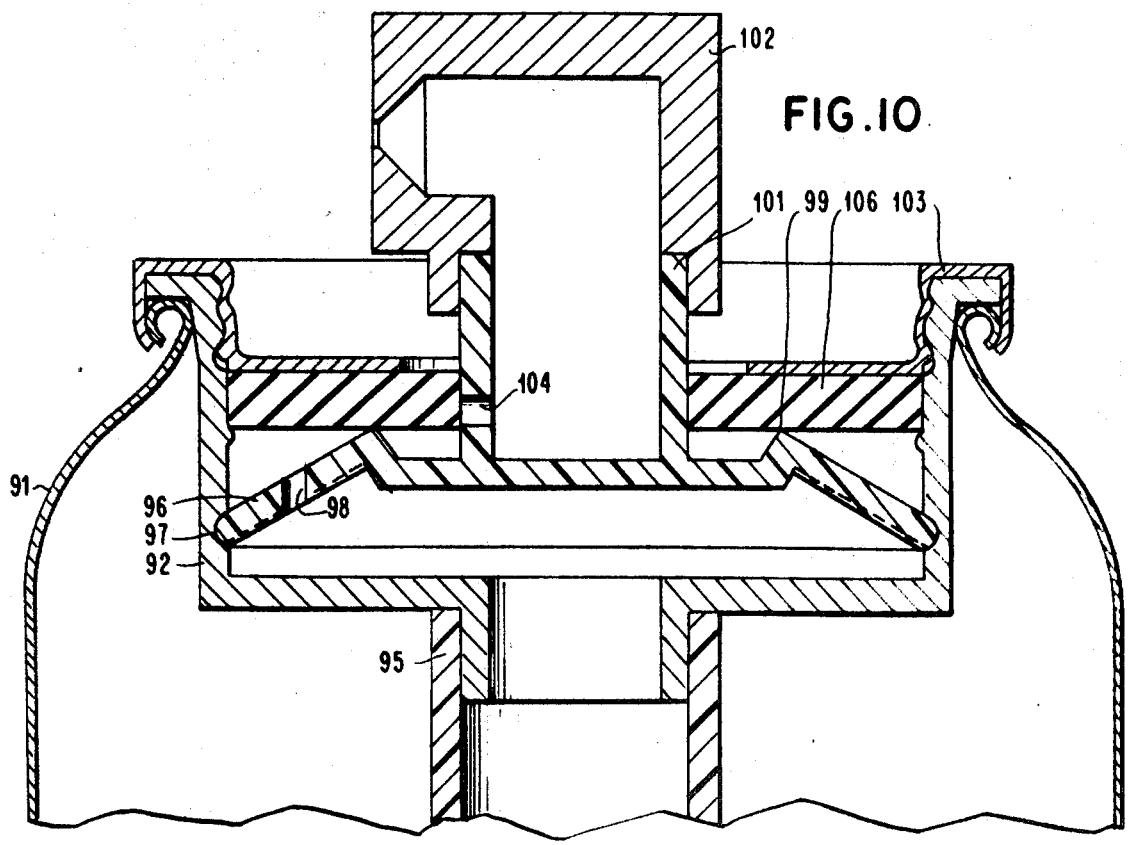

In the embodiment of FIG. 10, there is provided a valve housing 92 in the form of a tub having a bottom opening. This bottom opening has an extension tube for telescopically mounting thereon a riser which extends down to the bottom of the spray container. The membrane valve 96 is clamped within the valve housing 92, with the aid of an annular groove 97. As in FIG. 9, the membrane valve 96 has a through opening 98 through which the container contents discharge by way of the riser tube 95. The membrane 96 is provided with a ring-shaped sealing lip 99 which presses against the soft-elastic centrally perforated disc or washer 106, which serves as valve seat therefor. In the center of the membrane valve 96 there is provided an adapter tube extension 101 on which a spray head 102 is mounted. A valve cover 103 is mounted across the opening of the spray container so that it abuts the soft-elastic centrally perforated disc 106 at the upper surface thereof. The cover 103 has a central opening greater in diameter than the tube extension 101 so that, in addition to being vertically depressed, the spray head 102 can be shifted laterally so as to force the soft-elastic centrally perforated disc 106 downwardly without impairing the tightness of the sealing. The valve cover 103 envelops the bent-over reinforced upper edge of the aerosol container. The valve cover 103 thereby presses the upper edge of the valve housing 92 tightly sealed against the upper rim of the areosol container.

When the spray head 102 is actuated, the sealing lip 99 is raised so far off the seat 106, that the active substance can escape and reach the spray head 102 through the opening 104 in the tube extension 101.

FIG. 11 shows the connection of the membrane valve 96 with a crown cap bottle 107. The crown cap stopper 108 is provided in the center thereof with a through opening for mounting a spray or syphon head 109. The membrane 96 is held on the bottle mouth by the crown cap 108 with a soft-elastic centrally perforated disc or washer 100 therebetween. To receive and support the feed line or adapter tube of the syphon head 109, which is provided with an outlet opening 104, the membrane 96 is formed with a cup-shaped recess 120.

The wave-shaped membrane 96 is supported at the outer edge thereof by a shoulder 121 on the rim surrounding the opening of the crown cap bottle 107. Between the shoulder 121 and the cup-shaped recess 120, the membrane wall is reduced in thickness so as to provide the membrane with a better spring action.

In the embodiment of FIG. 11, the through opening 98 is provided with a tubular extension for mounting thereon a riser tube 95. By depressing the syphon head 109, the sealing lips 99 are forced off the valve seat for the washer 100, so that the contents of the bottle are caused to discharge through the riser tube and the syphon head 109, for example, due to the pressure of carbon dioxide in the case of a carbonated beverage. When sufficient liquid has been discharged, the syphon head 109 is released. The bottle then closes by itself so that no additional carbon dioxide can escape.

FIG. 12 shows the same embodiment as FIG. 11 provided with a tear-off seal 125 which is often made of tinfoil in the soft-drink industry.

FIG. 13 shows a valve cover 125 with an internal thread 122 by which it is threaded on an outside thread of the container mouth, after the centrally perforated disc 100 and the inherently elastic membrane 96 have previously been inserted in the screw cap 125, and the container 91 has been filled with its active contents.

The cup-shaped recess is provided in the embodiment of FIG. 13 with a cylindrical extension. A safety valve 123 is located in the extension and permits filling of the container 91 with a liquefied gas or a gas proper.

In addition, an excess pressure valve 124 forms a structural unit with the check valve 123. Complete safety is thereby afforded both when the container is being filled, as well as when the container contents are possibly overheated.

Figure 14:
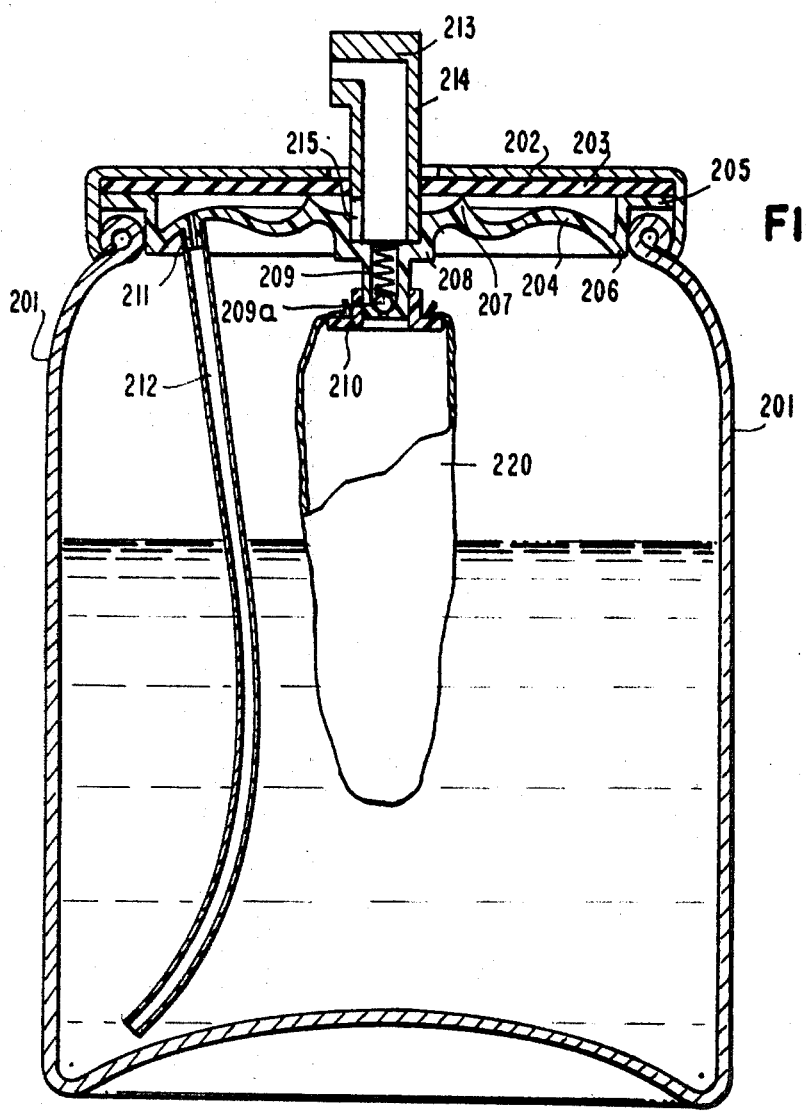

FIG. 14 is a longitudinal section of an aerosol container 201, which is sealed by a valve body comprised of a valve cover 202, a soft-elastic centrally perforated disc or washer 203 and a membrane valve 204. The membrane valve 204 is so constructed at the edge 205 thereof that it lies in a sealing relation upon the flanged edge of the container 201 and braces itself against the inside edge by means of downwardly drawn shoulder portion 206. This increases the spring action of the membrane 204.

In the middle of the membrane 204, there lies a ring-shaped sealing lip 207, which presses against the soft-elastic centrally perforated disc 203. The sealing lip 207 defines a cup-shaped recess 208 in which there is received an adapter or supply tube 214 provided with a spray head 213. An excess pressure valve 209 is mounted at the bottom of the recess 208. This makes it possible for an impermissible excess pressure of the expanding agent in the container to escape through the spray head 213. An adapter 210 is provided for mounting thereon a bag 220 for the expanding agent.

The membrane 204 is provided with one or more through openings 211 for the active substance. Riser tubes 212 are attached to the through openings 211 and extend to the bottom of the container 201. A flexible bag 220 may be provided in place of the riser tube 212, in which case the special bag 220 for the expanding agent is omitted. The bags 220 are preferably equipped with an adapter 210, which effects the connection with the excess pressure valve 209 or with the through opening 211. This adapter 210 may be sealed by using an exchangeable filled bag, for example by means of a screw-type closure.

The spray head 213 extends with the feed tube 214 through an opening of the valve cover 202, which is large enough to permit a vertical as well as a lateral movement of the spray head 213 or of the feed tube 214. The latter is inserted in a form-fitting sealing manner through the soft-elastic perforated disc 203 into the cup-shaped recess 208.

During the operation of the spray head 213, the sealing lip 207 is raised off the seat 203. The active substance then passes through the sealing lip 207 and through a slot-shaped opening 215 into the feeding tube 214 to the spray head 213.

FIG. 15 shows an embodiment wherein the feed tube 214 forms a structural unit with the membrane 204 and the spray head 213 is mounted on the feed tube 214. In this embodiment, the illustrated spray can 201 is subdivisible at the threaded connection 25 from the dome 201a thereof.

Figure 16:
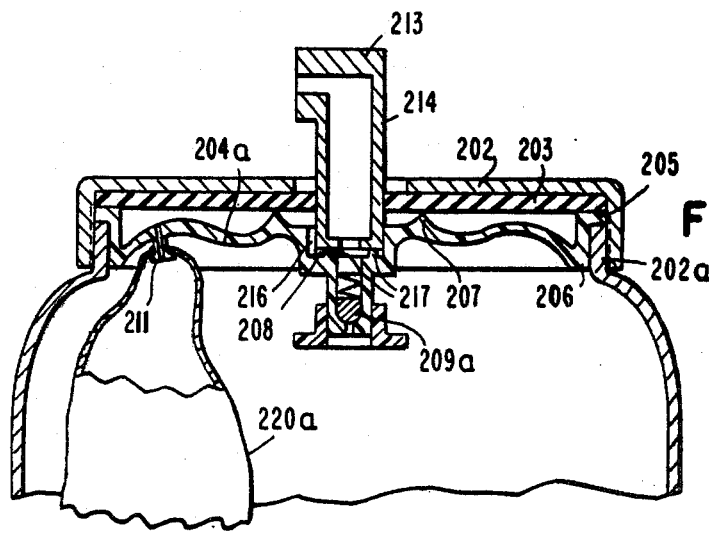

FIG. 16 shows an arrangement wherein metering grooves 216 are formed in the inner wall of a cup-shaped recess 208 through which the discharging substance may be directed. At the bottom of the recess 208 are spacing members 217 which prevent a snug mounting of the feed tube 214. Outward radially from the sealing lip 207, the membrane 204 is reduced in thickness at 204a in order to provide better elasticity when harder materials are used in making the membrane valve.

In this embodiment, the valve cover 202 is provided with an inner thread 202a and the orifice of the spray container or bottle is provided with an outer thread. This feature is especially preferred, since it affords easy accessibility, for example for cleaning or exchange of the valve equipment. Thus, a bag 20a previously filled with effective substance may be disposed or exchanged, as the case may be, with easy accessibility at the through opening 211 of the membrane.

FIG. 17 shows an embodiment whose flow-through grooves 218 and spacers 217 are mounted at the lower end of the feed tube 214, so that the bottom surface and the inner wall of the cup-shaped recess 208 are smooth and suitable also for other inserts, for example for filler nozzles.

FIG. 18 shows the use of the valve body in a divisible container, which may be opened and closed again by means of a screw thread 225. In this embodiment, the cup-shaped recess 208 is replaced by a tap 226 located in the middle of the membrane 204, a feeding tube 214 being slidable over the tap 226.

FIG. 19 shows the insertion of the filler nozzle 228 into the cup-shaped recess 208. The closure member 209a of the excess pressure valve 209 is raised from its seat by the magnet 229 which becomes energized during the filling process, and the filler substance is allowed to enter the container.

Figure 20:
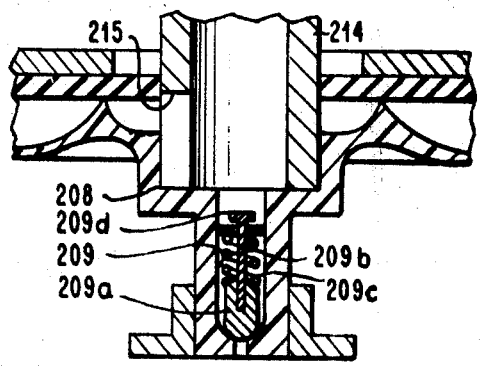

FIG. 20 shows another embodiment of the check valve 209. The sealing member 209a is equipped with a pin 209b which passes through the restoring spring 209c and whose end holds a magnet armature 209d.

Figure 21:
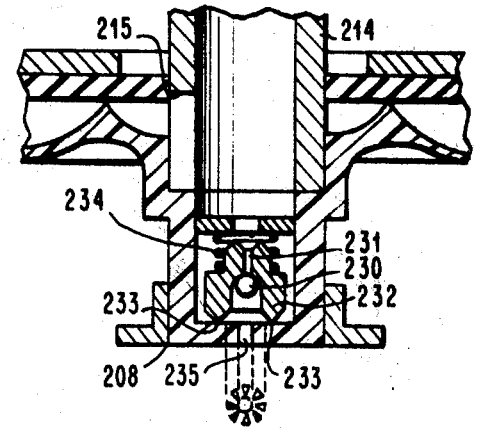

FIG. 21 shows in section a special construction of the excess pressure valve wherein a check valve 230 is installed into an axial through opening 31. The excess pressure valve is comprised of the closure member 232 whose sealing lips 233, with the aid of the restoring spring 234, engage the bottom of the cup-shaped recess 208 serving as the valve seat. The restoring spring 34 is biased upward against a centrally perforated disc.

The inner through opening 235 is formed, for example in the shape of a star, so that the check valve 230 is not closed during the filling process.

I claim:

1. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said center portion comprising an outlet tube and being formed with an opening therein, said flexible annular zone being formed with an opening therethrough, an annular sealing lip formed on one side of said plate-shaped membrane around said center portion thereof and between said opening of said center portion and said opening of said flexible annular zone, said annular sealing lip being structurally prestressed into engagement with a valve seat and defining a closed chamber therewith, and means for disengaging said annular sealing lip from the valve seat so as to provide communication between said chamber and the other side of said plate-shaped membrane through said opening in said flexible annular zone thereof.

2. Membrane valve according to claim 1 including a valve plate overlying said membrane, said valve plate forming a dome for a spray container.

3. Membrane valve according to claim 1 wherein said membrane valve is formed exclusively of stiff-elastic plastic material.

4. Membrane valve according to claim 1 including means for resiliently supporting said plate-shaped membrane at said marginal edge thereof, said supporting means being located at the inner surface of a spray container in the vicinity of an opening thereof across which said membrane is substantially entirely extensible.

5. Membrane valve according to claim 1 wherein said valve seat is located substantially in the plane of the opening of said spray container.

6. Membrane valve according to claim 1 wherein the surface of said flexible annular zone of said membrane is wave-shaped so as to form a springy annular bulge between said sealing lip and said marginal edge thereof.

7. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said flexible annular zone being formed with an opening therethrough, an annular sealing lip formed on one side of said plate-shaped membrane around said center portion thereof and being prestressed into engagement with a valve seat and defining a closed chamber therewith, means for disengaging said annular sealing lip from the valve seat so as to provide communication between said chamber and the other side of said plate-shaped membrane through said opening in said flexible annular zone thereof, a valve plate overlying said membrane, said valve plate forming a dome for a spray container, including a valve housing containing said membrane, the valve housing having an upper edge surrounded by said container dome.

8. Membrane valve according to claim 7 wherein said valve housing is mountable on an edge of a spray container at an open end thereof, and is securable thereto by the valve plate.

9. Membrane valve according to claim 7 wherein said valve housing is formed with a welding crown for mounting thereon a flexible separator bag.

10. Membrane valve according to claim 7 wherein said valve housing is formed with an extension for securing thereon a riser tube.

11. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said flexible annular zone being formed with an opening therethrough, an annular sealing lip formed on one side of said plate-shaped membrane around said center portion thereof and being prestressed into engagement with a valve seat and defining a closed chamber therewith, means for disengaging said annular sealing lip from the valve seat so as to provide communication between said chamber and the other side of said plate-shaped membrane through said opening in said flexible annular zone thereof, including means for resiliently supporting said plate-shaped membrane at said marginal edge thereof, said supporting means being located at the inner surface of a spray container in the vicinity of an opening thereof across which said membrane is substantially entirely extensible, said marginal edge being downwardly and radially outwardly inclined with respect to said center portion of said plate-shaped membrane.

12. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said flexible annular zone being formed with an opening therethrough, an annular sealing lip formed on one side of said plate-shaped membrane around said center portion thereof and being prestressed into engagement with a valve seat and defining a closed chamber therewith, means for disengaging said annular sealing lip from the valve seat so as to provide communication between said chamber and the other side of said plate-shaped membrane through said opening in said flexible annular zone thereof, including means for resiliently supporting said plate-shaped membrane at said marginal edge thereof, said supporting means being located at the inner surface of a spray container in the vicinity of an opening thereof across which said membrane is substantially entirely extensible, said valve seat being a soft-elastic disc having an edge located adjacent a wall of said spray container and including a relatively flat valve plate extending across and closing said container opening, said valve plate having a surface portion thereof firmly locking said edge of said soft-elastic disc against the wall of said spray container.

13. Membrane valve according to claim 12 wherein said valve plate has a flanged edge pressable from above and below into engagement with a peripheral bead formed near the opening of the spray container.

14. Membrane valve according to claim 12 including a valve housing receivable in the opening of the spray container and engageable with the rim thereof defining said opening.

15. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said flexible annular zone being formed with an opening therethrough, an annular sealing lip formed on one side of said plate-shaped membrane around said center portion thereof and being prestressed into engagement with a valve seat and defining a closed chamber therewith, means for disengaging said annular sealing lip from the valve seat so as to provide communication between said chamber and the other side of said plate-shaped membrane through said opening in said flexible annular zone thereof, means for resiliently supporting said plate-shaped membrane at said marginal edge thereof, said supporting means being located at the inner surface of a spray container in the vicinity of an opening thereof across which said membrane is substantially entirely extensible, and a spray head adapted tube integral with said membrane at the center portion thereof defined by said annular lip, and formed with at least one through opening.

16. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said flexible annular zone being formed with an opening therethrough, an annular sealing lip formed on one side of said plate-shaped membrane around said center portion thereof and being prestressed into engagement with a valve seat and defining a closed chamber therewith, means for disengaging said annular sealing lip from the valve seat so as to provide communication between said chamber and the other side of said plate-shaped membrane through said opening in said flexible annular zone thereof, means for resiliently supporting said plate-shaped membrane at said marginal edge thereof, said supporting means being located at the inner surface of a spray container in the vicinity of an opening thereof across which said membrane is substantially entirely extensible, and a supporting boss located in the center portion of said membrane defined by said annular lip, and a spray head adapter tube supported at its end on said supporting boss, said adapter tube being formed with at least one through opening.

17. Membrane valve according to claim 16 wherein said supporting boss and said adapter tube cooperate to define a predetermined flow-through groove wherethrough a working substance is passable.

18. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said flexible annular zone being formed with an opening therethrough, an annular sealing lip formed on one side of said plate-shaped membrane around said center portion thereof and being prestressed into engagement with a valve seat and defining a closed chamber therewith, means for disengaging said annular sealing lip from the valve seat so as to provide communication between said chamber and the other side of said plate-shaped membrane through said opening in said flexible annular zone thereof, and means resiliently supporting said plate-shaped membrane at said marginal edge thereof, said supporting means being located at the inner surface of a spray container in the vicinity of an opening thereof across which said membrane is substantially entirely extensible, said supporting means comprising an annular groove located at the wall of the spray container.

19. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said flexible annular zone being formed with an opening therethrough, an annular sealing lip formed on one side of said plate-shaped membrane around said center portion thereof and being prestressed into engagement with a valve seat and defining a closed chamber therewith, means for disengaging said annular sealing lip from the valve seat so as to provide communication between said chamber and the other side of said plate-shaped membrane through said opening in said flexible annular zone thereof, and a cup-shaped axial recess being formed in said center portion defined by said sealing lip for receiving therein a spray head adapter tube, at least one of said adapter tubes and said recess being formed with a flow-through groove, said membrane having a substantially flat annular surface surrounding said sealing lip, said marginal edge of said membrane being directed away from said sealing lip and transversely to said flat surface.

20. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said flexible annular zone being formed with an opening therethrough, an annular sealing lip formed on one side of said plate-shaped membrane around said center portion thereof and being prestressed into engagement with a valve seat and defining a closed chamber therewith, and means for disengaging said annular sealing lip from the valve seat so as to provide communication between said chamber and the other side of said plate-shaped membrane through said opening in said flexible annular zone thereof, said membrane having a marginal edge including a shoulder supportable on a rim of an opening formed at an end of a spray container, said membrane being formed with passages respectively for working substance and expansion agent receivable in said container, the working substance passage being eccentric and the expansion agent passage being coaxial to said membrane.

21. Membrane valve according to claim 20 wherein said passage for working substance has an extension for securing a riser tube thereto.

22. Membrane valve according to claim 20 wherein said passage for working substance has an extension for securing a bag thereto.

23. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said flexible annular zone being formed with an opening therethrough, an annular sealing lip formed on one side of said plate-shaped membrane around said center portion thereof and being prestressed into engagement with a valve seat and defining a closed chamber therewith, means for disengaging said annular sealing lip from the valve seat so as to provide communication between said chamber and the other side of said plate-shaped membrane through said opening in said flexible annular zone thereof, a cup-shaped axial recess being formed in said center portion defined by said sealing lip, said recess having a flow-through opening, and valve means for controlling flow through said flow-through opening.

24. Membrane valve according to claim 23 wherein said valve means is an excess pressure valve.

25. Membrane valve according to claim 24 wherein said excess pressure valve comprises a magnetically attractive closure member, and including a filler nozzle receivable in said axial recess, and magnet means receivable in said filler nozzle for magnetically attracting said closure member so as to open said excess pressure valve whereby filler substance may be fed therethrough through said filler nozzle.

26. Membrane valve according to claim 23 wherein said valve means is a check valve.

27. Membrane valve according to claim 26 wherein said check valve comprises a valve seat, a closure member engageable with said valve seat, a pin extending from said closure member and having a magnet armature at a free end thereof, and restoring spring means for continuously biasing said closure member into engagement with said valve seat.

28. Membrane valve according to claim 23 wherein said valve means comprises both an excess pressure valve and a check valve located in said axial recess.

29. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said flexible annular zone being formed with an opening therethrough, an annular sealing lip formed on one side of said plate-shaped membrane around said center portion thereof and being prestressed into engagement with a valve seat and defining a closed chamber therewith, and means for disengaging said annular sealing lip from the valve seat so as to provide communication between said chamber and the other side of said plate-shaped membrane through said opening in said flexible annular zone thereof, said valve seat being located on a soft-elastic centrally apertured disc.

30. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said flexible annular zone being formed with an opening therethrough, an annular sealing lip formed on one side of said plate-shaped membrane around said center portion thereof and being prestressed into engagement with a valve seat and defining a closed chamber therewith, means for disengaging said annular sealing lip from the valve seat so as to provide communication between said chamber and the other side of said plate-shaped membrane through said opening in said flexible annular zone thereof, an adapter tube connected at one end to said membrane at the center portion thereof defined by said annular lip, and a spray head mounted on the other end of said adapter tube, said spray head being a siphon head.

31. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said flexible annular zone being formed with an opening therethrough, an annular sealing lip formed on one side of said plate-shaped membrane around said center portion thereof and being prestressed into engagement with a valve seat and defining a closed chamber therewith, means for disengaging said annular sealing lip from the valve seat so as to provide communication between said chamber and the other side of said plate-shaped membrane through said opening in said flexible annular zone thereof, an adapter tube, and a spray head integral with said adapter tube at an upper end thereof and forming a structural unit therewith, said structural unit being inserted at the lower end thereof in a cup-shaped recess formed in the center portion of said membrane and having longitudinal grooves and spacers at said lower end thereof opposite the bottom surface of said cup-shaped recess.

32. Membrane valve for spray containers comprising a substantially plate-shaped membrane having a marginal edge adapted to be retained under stress substantially at the wall of a spray container, said plate-shaped membrane having a flexible annular zone between the marginal edge and a center portion thereof, said flexible annular zone being formed with an opening therethrough, an annular sealing lip formed on one side of said plate-shaped membrane around said center portion thereof and being prestressed into engagement with a valve seat and defining a closed chamber therewith, means for disengaging said annular sealing lip from the valve seat so as to provide communication between said chamber and the other side of said plate-shaped membrane through said opening in said flexible annular zone thereof, an adapter tube and a spray head connected thereto at one end thereof, said adapter tube being received with the other end thereof in a cup-shaped recess formed in the center portion of said membrane, said recess being formed with axially extending grooves on the inner wall surface thereof and with flow-through channels at the bottom surface thereof for conducting working substance discharging from said grooves into said adapter tube.

References Cited

UNITED STATES PATENTS

| | | | |
|---|---|---|---|
| 3,508,689 | 4/1970 | Webster | 222—402.24 |
| 2,681,752 | 6/1954 | Jarrett et al. | 251—320X |
| 2,862,648 | 12/1958 | Cooksley et al. | 251—353X |
| 3,348,742 | 10/1967 | Assalit | 222—394 |
| 3,416,770 | 12/1968 | Green | 251—354X |

ROBERT B. REEVES, Primary Examiner

D. A. SCHERBEL, Assistant Examiner

U.S. Cl. X.R.

222—402.24; 251—320, 354